(12) United States Patent
Jain

(10) Patent No.: US 10,196,496 B2
(45) Date of Patent: Feb. 5, 2019

(54) PROCESS FOR RECYCLING A METALIZED POLYESTER FILM

(71) Applicant: Pranay Jain, New Delhi (IN)

(72) Inventor: Pranay Jain, New Delhi (IN)

(*) Notice: Subject to any disclaimer, the term of this patent is extended or adjusted under 35 U.S.C. 154(b) by 0 days.

(21) Appl. No.: 14/781,194

(22) PCT Filed: Mar. 25, 2014

(86) PCT No.: PCT/IB2014/060126
§ 371 (c)(1),
(2) Date: Sep. 29, 2015

(87) PCT Pub. No.: WO2014/162238
PCT Pub. Date: Oct. 9, 2014

(65) Prior Publication Data
US 2016/0039992 A1    Feb. 11, 2016

(30) Foreign Application Priority Data
Mar. 31, 2013  (IN) .......................... 3342/DEL/2012

(51) Int. Cl.
| | |
|---|---|
| C08J 11/08 | (2006.01) |
| C08J 11/06 | (2006.01) |
| B29B 17/00 | (2006.01) |
| B29K 67/00 | (2006.01) |
| B29L 7/00 | (2006.01) |
| B29L 9/00 | (2006.01) |

(52) U.S. Cl.
CPC ........... *C08J 11/08* (2013.01); *B29B 17/0026* (2013.01); *C08J 11/06* (2013.01); *B29K 2067/003* (2013.01); *B29L 2007/008* (2013.01); *B29L 2009/008* (2013.01); *C08J 2367/02* (2013.01); *C08J 2367/03* (2013.01); *Y02W 30/62* (2015.05); *Y02W 30/701* (2015.05)

(58) Field of Classification Search
CPC ........ C08J 11/06; C08J 11/08; C08J 2367/02; C08J 2367/03; Y02W 30/62; Y02W 30/701; B29L 2007/008; B29L 2009/008; B29B 17/0026; B29K 2067/003
USPC .................................................. 521/40–49.8
See application file for complete search history.

(56) References Cited

U.S. PATENT DOCUMENTS

| | | |
|---|---|---|
| 3,586,647 A | 6/1971 | Kremer et al. |
| 3,657,388 A | 4/1972 | Schweizer et al. |
| 3,969,324 A | 7/1976 | Berkau et al. |
| 5,876,644 A * | 3/1999 | Nichols ..................... B29B 9/16 264/101 |
| 6,436,322 B1 | 8/2002 | Fredl |
| 7,893,122 B2 | 2/2011 | Fregoso-Infante et al. |
| 2011/0274796 A1* | 11/2011 | Bower ..................... B32B 15/08 426/243 |

OTHER PUBLICATIONS

Nov. 24, 2014 International Search Report issued in International Patent Application No. PCT/IB2014/060126.

\* cited by examiner

*Primary Examiner* — Frances Tischler
(74) *Attorney, Agent, or Firm* — Oliff PLC

(57) ABSTRACT

The present invention relates to a process for converting the waste or used metalized polyester (PET) film into recycled PET (RPET) as a starting raw material for various utility products. Particularly, the present invention provides a process for the manufacturing of high quality strapping or monofilament yarn or sheets from the recycled metalized PET film.

3 Claims, 2 Drawing Sheets

Graphic representation of recycling process

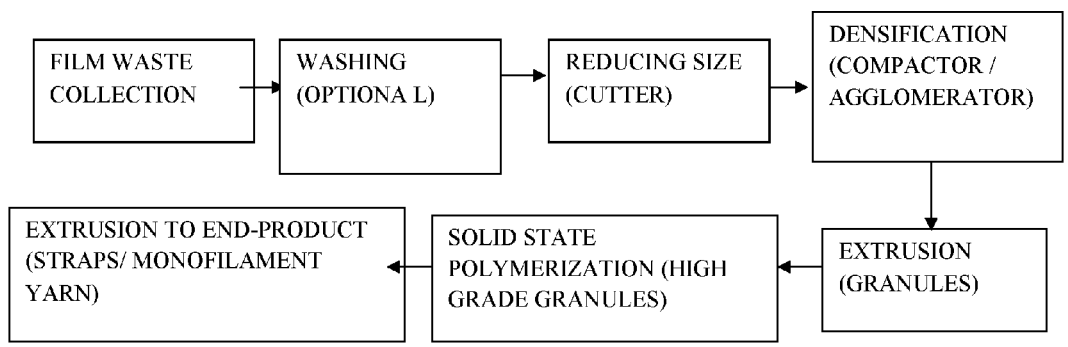
Figure 1: Graphic representation of recycling process

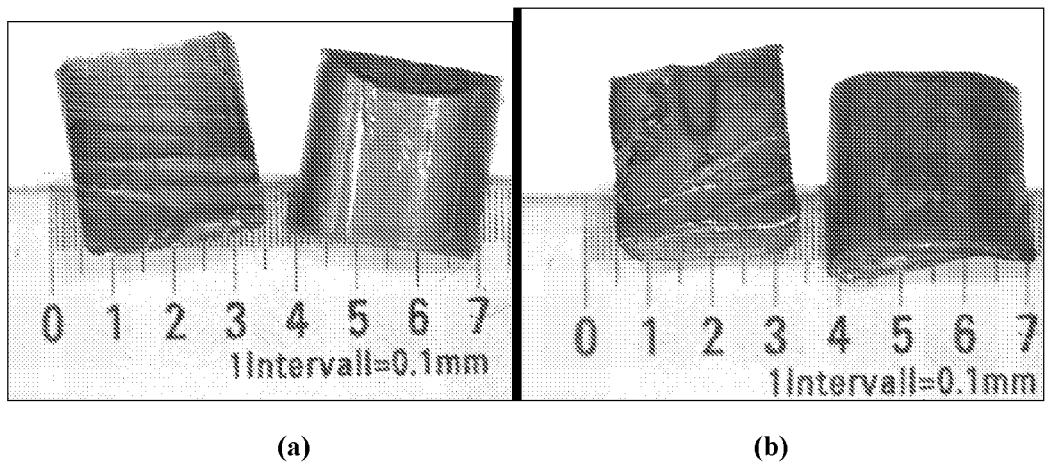
Figure 2: Microscope Analysis
(a) Pellet sliced with degassing
(b) Pellet sliced without degassing

PROCESS FOR RECYCLING A METALIZED POLYESTER FILM

FIELD OF INVENTION

The present invention relates to a process for converting the waste and used metalized Polyester (PET) film into recycled PET (RPET) as a starting raw material for various utility products. Particularly, the present invention provides a process for the manufacturing of high quality strapping or monofilament yarn or sheets from the recycled metalized PET film.

BACKGROUND AND PRIOR ART OF THE INVENTION

It is known that metalized PET films provide optimal solution for high oxygen and general gas barrier levels, aroma and flavor retention. The metallization of PET film also results in significant improvement in water vapor barrier. Metalized PET film is proven to achieve special optical properties or a metal look for decorative applications in diffusion of gases and flavor through the film. Although metalized PET film market continues to grow, there are no established sustainable solutions to recover and recycle post-consumer and postindustrial metalized PET films waste or any application of this material. While PET recycling industry has been established for several decades and accepted as the most leading recycled material, metalized PET films are discarded as waste and ends up in the landfill. The growing consumer awareness towards recycling of plastics demands requires creativity in recycling of metalized PET films and its subsequent suitable applications. There are no known commercially existent metalized PET films recycling facilities in the world.

In order to increase the life cycle and reduce the carbon footprint, metalized PET films needs to be recycled effectively and efficiently. However, there are numerous issues that make recycling of PET films difficult. The intrinsic viscosity (also known as I.V.) of metalized PET film is typically less than 0.6 dl/g making it unsuitable for many applications such as sheet extrusion/thermoforming and mono filament yarn after recycling. Mechanical properties of PET films with 0.6 dl/g are very inferior and consequently limit its potential application after recycling. The color and clarity of recycled metalized film poses challenges in clear applications. The increased haze and B value (yellowness) of metalized PET film makes it unattractive for most applications.

Unlike, PET bottles recycling, there are no established collection centers or material recovery facilities for PET films. Secondly, lack of consumer education, awareness and consequent participation for the recyclability of metalized films makes it difficult to be collected and recycled even from an industrial source. The absence of definitive and desired sources for collection of metalized PET films makes a poor business case for the technology to be designed for this material.

The other reason for lack of Metalized PET film includes unknown science of washing Metalized PET films. The use of conventional PET recycling techniques, including hot washing with proven alkaline cleaners, defoamer additives and other additives are yet to be proven effective for washing and removing Aluminum layer and other contaminates from Metalized PET films. The effect of such additives and washing methods is unknown in public domain.

In view of the above-said challenges and keeping environment safety into consideration the applicant of the present invention comes out with a process for converting used/waste metalized PET film into recycled PET as a starting raw material for various utility products. Hence, an environmental friendly process for recycling of metalized PET film is developed to produce recycled PET pellets with enhanced physical, mechanical, optical and aesthetic properties. The physical, mechanical and aesthetic properties of the straps, yarn, and sheet as produced from the recycled metalized PET are comparable to virgin PET pellets used for the same application. This is evident from the Table 6 & 7.

OBJECTS OF THE INVENTION

The primary objective of the present invention is to provide a process for converting the waste and used metalized PET film into recycled PET as a starting raw material for various utility products.

Another objective of the present invention is to provide a process for recycling of metalized PET film.

Yet another objective of the invention is to provide a process for the manufacturing of high quality strapping or monofilament yarn or sheets from the recycled metalized PET film.

SUMMARY OF THE INVENTION

The present disclosure is directed to a process for recycling of metalized PET film. Furthermore, the present invention provides a process of manufacturing high quality PET Straps, PET monofilament yarn, opaque PET sheet and PET fiber as obtained from the recycling of metalized PET film. The present disclosure is also directed at optional washing process of metalized PET film to obtain clear PET films that could be used for obtaining PET which could be used for making PET fiber, PET films and clear PET Sheets as well in addition to PET straps and PET monofilament yarn.

BRIEF DESCRIPTION OF THE FIGURES

FIG. 1: Graphic representation of recycling process

FIG. 2 (a): Microscope Analyses of pellet sliced with degassing

FIG. 2 (b): Microscope Analyses of pellet sliced without degassing

BRIEF DESCRIPTION OF THE TABLES

Table 1: Indicative IV requirements for most PET applications

Table 2: Key processing parameters during the recycling process

Table 3: The test results for degassing and without degassing

Table 4: Properties of clear recycled PET pellets (after washing) and metalized recycled PET pellets after extrusion Table 5: Properties of clear recycled PET pellets (after washing) and metalized recycled PET pellets after SSP Table 6: PET Straps from recycled metalized film without any anti-split additive Table 7: PET Straps made from virgin PET resin without anti-split additive Table 8: PET Straps from recycled metalized film with anti-split additive-larger cross section

DETAILED DESCRIPTION OF THE INVENTION

While the invention is susceptible to various modifications and alternative forms, specific aspect thereof has been shown by way of example and will be described in detail below. It should be understood, however that it is not intended to limit the invention to the particular forms disclosed, but on the contrary, the invention is to cover all modifications, equivalents, and alternative falling within the spirit and the scope of the invention.

The Applicants would like to mention that the examples are mentioned to show only those specific details that are pertinent to understanding the aspects of the present invention so as not to obscure the disclosure with details that will be readily apparent to those of ordinary skill in the art having benefit of the description herein.

The terms "comprises", "comprising", or any other variations thereof, are intended to cover a non-exclusive inclusion, such that a process that comprises a list of components does not include only those components but may include other components not expressly listed or inherent to such process. In other words, one or more elements in a system or process proceeded by "comprises . . . a" does not, without more constraints, preclude the existence of other elements or additional elements in the system or process.

Accordingly, the present invention relates to a process of converting waste or used metalized PET film to obtain recycled PET pellets suitable to produce PET Straps, monofilament yarn and PET Sheets comprising steps of:

(i) collecting waste or used metalized PET film;
(ii) obtaining crushed film or flakes by reducing the size of waste or used metalized PET film either before or after washing by a grinder or granulator or by cutter-compactor;
(iii) washing the film of step (i) and/or crushed film or flakes of step (ii) in hot water bath or in alkaline or in alkali solution having concentration in the range of 0.5 to 3% in water solution at room temperature to 90° C.;
(iv) densifying the film or flakes of step (iii) in a agglomerator to increase the bulk density of the film or flakes;
(v) feeding thus obtained film or flakes of step (iv) into an extruder for devolatilizing, homogenizing and converting the same into melt;
(vi) conveying the melt of step (v) into a pelletizer to obtain recycled PET pellets having intrinsic viscosity less than 0.55 dl/g;
(vii) increasing intrinsic viscosity of the pellets obtained in step (vi) from 0.55 dl/g to 1.0 dl/g by solid state polymerization or by chain extenders or by Erema's Vacurema technology to obtain desired recycled PET pellets suitable for making high quality strapping or monofilament yarn or sheets.

In other embodiment of the present invention the process of cleaning waste or used metalized PET film, the alkaline solution is caustic soda having concentration in the range of 0.5 to 3 wt./v %, preferably in the range of 1 to 2 wt./v % at room temperature to 90° C. preferably at 60-85° C.

In yet another embodiment of the present invention the process of converting waste or used metalized PET film to RPET pellets, the metalized PET film is agglomerated and extruded, pelletised and intrinsic viscosity is enhanced in a solid state polymerization process from 0.55 dl/g to 1.0 dl/g, preferably from 0.70 dl/g to 0.84 dl/g.

In yet another embodiment of the present invention the process of converting waste or used metalized PET film to RPET pellets the chain extenders such as di-functional or multi-functional chemical compounds are used to enhance intrinsic viscosity.

In yet another embodiment of the present invention a high quality strapping or monofilament yarn or sheets are obtained from the recycled PET pellets.

In yet another embodiment of the present invention in PET strapping optionally additives such as coloring agents or anti-splitting agents or combination thereof are added.

In yet another embodiment of the present invention in PET strapping the coloring agents such green or blue coloring agents or combination thereof are added for decreasing yellowness index in the strap.

In yet another embodiment of the present invention in PET strapping the anti-splitting agents are added to improve tenacity of recycled PET and helps in reducing the splitting of strap.

In yet another embodiment of the present invention the PET strapping is prepared by extrusion process at temperature in 270-295° C. range with single or multiple member of tapes wherein stretch ratio is in the range of 5:1 and cooling is carried out without turbulence, at temperature up to 40° C., maintaining the distance of 10 to 15 cm between die and surface of cooling bath.

In yet another embodiment of the present invention the PET strapping is stretched by stretching in two stages where lowest possible stretch ratio is kept in the first stage and the highest possible ratio is kept in the second stage.

In yet another embodiment of the present invention the PET strapping having tensile strength in the range of 472 $N/mm^2$ to 485 $N/mm^2$ and elongation in the range of 12.1% to 12.4%.

In yet another embodiment of the present invention the PET strapping wherein the tensile strength and elongation are similar to that of straps produced from virgin PET pellets.

The process involved in recycling of PET film is described below in detail and in FIG. 1.

Collection of Metalized PET Film Waste

Various collection mechanisms can be used in order to improve the bulk density of the film as well as to ensure that minimum contamination occurs in the storage, material handling and transportation of the metalizedmetalized film. These include baling and shrink wrapping of the films and compaction techniques.

Size Reduction

The collected material may be size reduced either before or after the washing process using a grinder or granulator. It may also be achieved directly in the cutter-compactor or the agglomerator as explained under the extrusion process. Size reduction facilitates further processing of the material.

Washing of Metalized PET Films

The metalized PET film can be washed in a hot washing water bath tank or at room temperature with preferred level of an alkaline solution, such as a solution containing caustic soda or in a solvent such as a hydrocarbon solvent. The desired level of caustic soda in the range of 0.5 to 3% in a water solution at room temperature to 90° C. or any other suitable alkali solution. Keeping the metalized film in 1% caustic soda solution and 80-85° C. water temperature removed aluminum within few seconds. The time required to remove aluminum from the metalized PET film for similar caustic soda solution was two minutes at room temperature water. The aluminum completely dissolves and the water acts as an acid. The aluminum layer from metalized PET film is removed and clear PET film is obtained after multiple washing stages varying from 2 to 10 times.

One notable aspect of the washing of metalized PET film revealed that reaction time and caustic solution did not adversely affect the intrinsic viscosity of the metalized PET films. The IV of the film remained unchanged regardless of caustic soda and residence time in the water tank.

The process of washing is optional in nature and helps in making the end-material clear as compared to silver metallic gray color of unwashed material.

The washing process also helps in removing dust and other foreign particles that get collected along with the waste metalized film during the process of storing, material handling and transportation. Other processes to remove external impurities are floatation or sedimentation process and cyclone separation and/or magnetic and electrostatic separation of metals.

Extrusion of Metalized PET Film

The process of the present invention includes use of cutter-compactor technology that connects to a continuously filled pelletizing extruder. The washed or unwashed metalized PET films are fed into the cutter-compactor where the material is cut, mixed, heated, dried (to remove moisture and prevent the undesirable hydrolytic degradation) densified and buffered. This densification process can also be achieved using an agglomerator which essentially performs the same function of compacting and increasing the bulk density of the material. The dried, compacted metalized PET film is fed into the plasticating extruder where devolatilization and homogeneous mixing takes place. The PET melt is then cleaned in the self-cleaning filter. Following this, the melt is conveyed pelletizer to obtain uniform and consistent recycled PET pellets.

During the extrusion process, various additives may be added to modify the properties of the PET pellets. These could be in the nature of colours or chain extenders or other functional additives. In one embodiment, green colour was added to the waste metalized PET film during the extrusion process to achieve green colour recycled PET pellets.

The metalized PET film converted into PET pellets has an intrinsic viscosity (I.V.) of about 0.56 to 0.62 dl/g. The mechanical properties such as impact strength, tensile strength, flexural modulus and elongation are very poor at such a low I.V. range of 0.56 to 0.62. As can be observed from the table below that very few PET applications are there for low IV materials.

TABLE 1

Indicative IV requirements for most PET applications

| PET Application | IV (dl/g) |
| --- | --- |
| PET Bottles | 0.75-0.84 |
| PET Sheets | 0.64-0.78 |
| Bixially-oriented PET Films | >0.60 |
| Monofilament Yarn | 0.65-1.50 |
| Partially-oriented Yarn | 0.62-0.70 |
| PET Staple Fiber | 0.58-0.70 |
| PET Straps | 0.70-0.90 |

IV Enhancement Process

In order to improve the mechanical properties and make it suitable for commercial applications, the recycled PET pellets I.V. has to be increased significantly. For example, in one embodiment, the intrinsic viscosity is increased through a solid state polymerization process 0.56 to 0.84 dl/g. In one more instance the intrinsic viscosity is increased to 0.65 dl/g. To achieve the IV increase the following processes were used:

a. Solid State Polymerisation (SSP) in a tumble dryer or vacuum reactor.

The rate of I.V. increase depends on the SSP process parameters and starting I.V. of the input material. In one embodiment, the pellets are introduced into a reactor (SSP reactor) which is subject to heat and vacuum to maintain an inert environment. Alternatively, an inert gas such as Nitrogen may be introduced to achieve the same objective. The pellets are kept in the reactor at temperatures ranging from 205 to 230° C. for a period of 4 hours to 30 hours. In another embodiment, the pellets are first crytallised by pre-heating them at temperatures ranging from 160 to 180° C. and thereafter placing them in the SSP reactor. The process of Solid State Polymerisation also changes the form of the pellets from Amorphous to Crystalline which is easier to process in the end-applications.

b. Use of chain extenders can be made to increase the IV by upto 20% of the input I.V. This involves the use of di-functional or multi-functional use of chemical compounds aimed at rebuilding molecular weight and physical properties of degraded thermoplastics by bridging their functionally terminated chains, through a reaction known as "chain extension". These reactions are normally carried out in the melt phase of the polymer during the extrusion process. There is normally a limitation to the extent that the chain extenders can be used in a beneficial manner.

c. Use of Erema's Vacurema technology. Here the densified material is subject to reaction in a vessel to enhance the IV prior to the extrusion process. The maximum IV increase in this process normally is 10%. The inventor agglomerated the metalized film and ran the material through vacurema process in which the IV was enhanced. Thereafter, the material was extruded to make pellets which would be quite suitable for making PET straps. By this technique it was able to increase the IV by 19% as compared to a maximum of 10%.

Solid State Polymerisation process has been disclosed in the following U.S. Pat. No. 3,586,647, U.S. Pat. No. 3,657,388 and U.S. Pat. No. 3,969,324. In the above patents, the processes are directed to increasing the molecular weight of prepolymers made from virgin materials. However, the present disclosure reveals the increase in intrinsic viscosity of the polymer chips made from recycled materials including metallised polyester film.

Applications

In the present invention a high quality strapping or monofilament yarn or sheets are obtained from the recycled PET pellets.

PET Straps

PET Strapping is made by extrusion process with single or multiple numbers of tapes with required width. A de-humidifying dryer is used as it reduces moisture to less than 40 ppm required for trouble free processing & achieving physicals. The strap is made by a process in which extruded strand of PET is subjected to plurality of stretching steps with final stretch ratio of around 5:1. Machine consists of a single screw/twin screw extruder and die is made as per general rules of streamlined polymer flow: no dead corners, short dwell-time in die & homogeneous temperature all over the die.

Cooling is done by water at temperature of 35-40° C. The water must move slowly i.e. 'no turbulence'. A critical parameter to decrease splitting is a distance (air gap) of 10 to 15 cm between die and surface of cooling bath to be maintained. The total stretching is to done in two stages. The lowest possible stretch ration is kept in the first zone and the highest possible ratio in the second zone. A light 'knurling' is done for a tight grip in handling and avoiding a slippage in usage. There is an optional facility of roto grauve printing at the end of the line.

A typical line will have screw, thermo regulated zones, metering pump, die head group, water cooling tank, slow stretching draw stand, diathermic oil heating unit (2 nos.) air stretching oven, fast stretching draw stand, embossing and annealing unit, haul-off draw sand and a volumetric dosing system on main extruder. The strap machine wherein PET flakes can be used comes with a crystallising system and a de-humidifier for crystallised pellets.

Screw Geometry & Process Parameters for producing PET strapping wherein L/D ratio is in the range of 24:1 to 32:1, compression ratio: 1:2 to 1:3, recommended temperature range is 270-290° C. In order to prevent degradation, polymer temperature should not exceed 310° C. and preferably kept below 300° C. Additives such as colorants are added to recycle PET pellets (normally green). The neck piece is mounted on feed throat to which dosing unit is attached. In order to further improve the physical properties, anti-splitting additives are added, which primarily improve tenacity of recycled PET. In case of PET it helps in reducing it the splitting of strap observed in processing and use, especially when higher quantities of recycled PET is used. This results in reduced fibrillation & increased melt strength.

In one embodiment the high I.V. pellets from metalized film are used for extrusion of PET straps with tensile strength in the range of 472 N/mm$^2$ to 485 N/mm$^2$) and elongation in the range of 12.1% to 12.4%. The extruded PET straps can be used for various industrial applications such as parcel packaging, natural and artificial fibers (such as cotton bales and yarns), brick industry and packaging of logs etc. PET straps can be extruded in silver metallic gray color from unwashed metalized PET film manifesting natural aluminum color in PET strapping. PET straps obtained from clear SSP pellets from metalized PET film can be colored in conventional green strapping by adding the appropriate green color concentrate. In another instance, a colouring agent such as green colour has been added directly to the silver metallic gray pellets produced from unwashed metalized PET film to achieve green colour PET straps.

Monofilament Yarn

In another embodiment SSP pellets of metalized PET film can be extruded for mono filament yarn applications with adequate mechanical properties. Extrusion of monofilament requires large number of process steps as monofilament properties are determined by many factors such as the rheological properties during extrusion and draw down of monofilament after they emerge from die-plate holes. The rheological properties are dependent on the SSP process of metalized PET film pellets.

PET Sheets

In another embodiment coloured PET sheets can be directly extruded from the IV enhanced recycled PET pellets/pellets. In accordance with the present disclosure during sheet extrusion process using PET pellets made from washed metalized film recycling process, an optical brightener/tinting agent like (water blue color concentrate) is added to negate the yellowness and improve the B value of extruded sheet. The extruded sheet appears sparkling blue and masking dull yellow appearance of typical RPET sheet. The extruded PET sheet can be used in various thermoforming packaging applications.

In another embodiment of the invention, pellets from recycled metalized PET films can be used in indirect food contact application by using the pellets in the middle layer of sandwich type co-extrusion structure. In another aspect of the invention the pellets of metalized PET can be used for direct food contact application by using a de-contamination process under vacuum and for specific time and temperature that reduces harmful dietary substance below FDA thresholds of less than one part per billion. The decontaminated pellets can be extruded into PET sheet and used for various thermoforming packaging applications.

PET Fiber

PET fiber can be extruded from the pellets/pellets obtained from the metalized PET film. Since the IV requirement of PET fiber is low, this application can use both the pre-SSP and post-SSP pellets in its production process.

EXAMPLES

The following examples are given by way of illustration of the present invention and therefore should not be construed to limit the scope of the present invention. Recycling of Aluminium coated PET film (Metalized PET film)

Following were measured to observe the quality of the recycled PET granules made from Metalized PET film:
    performance of the recycling-line
    test with standard-degassing
    test without degassing FIG. 2, represents the Microscope Analysis of pellets sliced with degassing and pellets sliced without degassing and it is observed with high vacuum there was less IV-decrease. The test of degassing was performed with standard degassing method. From the Tables 6 to 8 it is evident that the important mechanical properties of PET straps produced from recycled Metalized PET pellets are comparable to the virgin PET pellets. The strength and other mechanical properties are direct dependent on the cross-section of the strap. While, higher cross-section results in higher break load strength, the tensile strength of different sizes can be compared. Hence, by recycling used/waste metalized PET by the process as disclosed in the present invention useful PET pellets can be produced and used as a starting raw material for various utility products.

ADVANTAGES OF THE INVENTION

A waste metalized PET film is recycled and reduces the environmental effect of using virgin PET.

A waste metalized PET film is recycled and converted into PET pellets with enhanced intrinsic viscosity.

A recycled PET pellets are used for manufacturing high quality strapping or monofilament yarn or sheets with improved mechanical properties.

The strap produced by recycling of metalized PET film showed a tensile strength in the range of 472 to N/mm$^2$ to 485 N/mm$^2$ and elongation at break in the range of 12.1% to 12.4%. Considering that the raw material used has been recycled, the above values obtained are very good.

TABLE 2

Key processing parameters during the recycling process

| PROCESS PARAMETERS | Unit | With Degassing | Without Degassing |
|---|---|---|---|
| Die plate | [mm] | 10 × 4.5 | 10 × 4.5 |
| number of pelletizer knives | [pcs] | — | — |
| ØAG-load | [%] | 81 | 81 |
| extruder speed | [rpm] | 100 | 110 |
| diff back flush pressure | [bar] | 90 | 90 |

TABLE 2-continued

Key processing parameters during the recycling process

| PROCESS PARAMETERS | Unit | With Degassing | Without Degassing |
|---|---|---|---|
| speed pelletizer | [rpm] | 80 rpm strand | 80 rpm strand |
| temp. extruder | [° C.] | 270 | 270 |
| temp. degassing | [° C.] | 270 | 270 |
| temp. filter | [° C.] | 280 | 290 |
| temp. pelletizer | [° C.] | 280 | 300 |
| Water temp. pelletizer | [° C.] | 18 | 18 |

TABLE 3

The test results for degassing and without degassing

| No. | Materials | Explanation | IV |
|---|---|---|---|
|  | INPUT-Material |  |  |
| 1 | Metalized PET Film | Input from shredder | 0.567 |
| 2 | Metalized PET Film | Input film | 0.583 |
|  | RPET pellets |  |  |
| 1 | RPET pellets from Metalized PET Film | without Degassing | 0.540 |
| 2 | RPET pellets from Metalized PET Film | with Degassing | 0.547 |

TABLE 4

Properties of clear recycled PET pellets (after washing) and metalized recycled PET pellets after extrusion

| S. No. | Material Test Method | Intrinsic Viscosity dl/g ASTM-D 4603 | Ash wt % ASTM D-5630 |
|---|---|---|---|
| A | Recycled PET Clear Pellets |  |  |
| 1 | Sample 1 | 0.585 | 0.024 |
| 2 | Sample 2 | 0.559 | 0.039 |
| 3 | Sample 3 | 0.551 | 0.045 |
| 4 | Sample 4 | 0.5780 | 0.040 |
| 5 | Sample 5 | 0.588 | 0.035 |
|  | Range | 0.55-0.60 | 0.010-0.050 |
| B | Recycled PET Metallic Pellets |  |  |
| 1 | Sample 1 | 0.530 | 0.565 |
| 2 | Sample 2 | 0.543 | 1.478 |
| 3 | Sample 3 | 0.563 | 1.207 |
| 4 | Sample 4 | 0.568 | 1.056 |
| 5 | Sample 5 | 0.584 | 0.772 |
|  | Range | 0.52-0.60 | 0.5-1.5 |

TABLE 5

Properties of clear recycled PET pellets (after washing) and metalized recycled PET pellets after SSP

| S. No. | Material Test Method | Intrinsic Viscosity dl/g ASTM-D 4603 | Ash wt % ASTM D-5630 |
|---|---|---|---|
| A | Recycled PET Clear Pellets |  |  |
| 1 | Sample 1 | 0.847 | 0.033 |
| 2 | Sample 2 | 0.844 | 0.034 |
| 3 | Sample 3 | 0.853 | 0.030 |
| 4 | Sample 4 | 0.824 | 0.029 |
| 5 | Sample 5 | 0.839 | 0.035 |
|  | Range | 0.82-0.86 | 0.010-0.050 |
| B | Recycled PET Metallic Pellets |  |  |
| 1 | Sample 1 | 0.795 | 0.945 |
| 2 | Sample 2 | 0.850 | 0.980 |
| 3 | Sample 3 | 0.806 | 1.446 |
| 4 | Sample 4 | 0.786 | 1.093 |
| 5 | Sample 5 | 1.01 | 0.990 |
|  | Range | 0.78-1.01 | 0.5-1.5 |

TABLE 6

PET Straps from recycled metalized film without any anti-split additive

| Sample Nr | Cross Section SO mm$^2$ | Break Load F max N | Tensile Strength Rm N/mm$^2$ | Elongation −F max % |
|---|---|---|---|---|
| 1 | 5.43 | 2569.46 | 473.41 | 12.10 |
| 2 | 5.43 | 2613.71 | 481.56 | 12.22 |
| 3 | 5.30 | 2519.41 | 475.62 | 12.23 |
| 4 | 5.38 | 2611.93 | 485.78 | 12.44 |
| 5 | 5.48 | 2539.65 | 463.59 | 12.32 |
| 6 | 5.45 | 2518.43 | 462.16 | 12.41 |
| 7 | 5.47 | 2572.58 | 470.22 | 12.18 |
| 8 | 5.44 | 2518.24 | 462.74 | 12.28 |
| Mean | 5.42 | 2557.93 | 471.89 | 12.27 |
| Min. | 5.30 | 2518.24 | 462.16 | 12.10 |
| Max. | 5.48 | 2613.71 | 485.78 | 12.44 |

ASTM D-3950 is used for testing the break load, tensile strength and elongation

TABLE 7

PET Straps made from virgin PET resin without anti-split additive

| Sample Nr | Cross Section SO mm$^2$ | Break Load F max N | Tensile Strength Rm N/mm$^2$ | Elongation −F max % |
|---|---|---|---|---|
| 1 | 5.51 | 2450.65 | 444.40 | 9.26 |
| 2 | 5.50 | 2643.41 | 480.62 | 8.66 |
| 3 | 5.46 | 2582.49 | 473.29 | 10.40 |
| 4 | 5.48 | 2428.95 | 443.38 | 9.67 |
| 5 | 5.52 | 2586.68 | 468.45 | 9.66 |
| 6 | 5.43 | 2531.24 | 465.75 | 9.55 |
| 7 | 5.52 | 2543.03 | 460.55 | 8.10 |
| 8 | 5.54 | 2326.08 | 419.61 | 7.88 |
| Mean | 5.50 | 2511.57 | 457.01 | 9.15 |
| Min. | 5.43 | 2326.08 | 419.61 | 7.88 |
| Max. | 5.54 | 2643.41 | 480.62 | 10.40 |

ASTM D-3950 is used for testing the break load, tensile strength and elongation

TABLE 8

PET Straps from recycled metalized film with anti-split additive-larger cross section

| Sample Nr | Cross Section SO mm² | Break Load Fmax N | Tensile Strength Rm N/mm² | Elongation −F max % |
|---|---|---|---|---|
| 1 | 9.09 | 4281.04 | 471.12 | 12.33 |
| 2 | 9.21 | 4443.22 | 482.43 | 12.09 |
| 3 | 9.11 | 4360.81 | 478.75 | 12.23 |
| 4 | 9.16 | 4344.11 | 474.28 | 12.55 |
| Mean | 9.14 | 4357.30 | 476.65 | 12.30 |
| Min. | 9.09 | 4281.04 | 471.12 | 12.09 |
| Max. | 9.21 | 4443.22 | 482.43 | 12.55 |

ASTM DIN 51220 is used for testing the break load, tensile strength and elongation

The invention claimed is:

1. A process of converting waste or used metalized polyethylene terephthalate (PET) film to obtain recycled metalized PET pellets suitable to produce PET straps, monofilament yarn and PET sheets comprising steps of:
   (i) collecting waste or used metalized PET film;
   (ii) obtaining crushed film or flakes by reducing the size of the waste or used metalized PET film by a grinder or granulator or by cutter-compactor;
   (iii) densifying the film or flakes of either step (i) or step (ii) in an agglomerator to increase the bulk density of the film or flakes;
   (iv) feeding the thus obtained film or flakes of step (iii) into an extruder for devolatilizing, homogenizing and converting the same into melt;
   (v) conveying the melt of step (iv) into a pelletizer to obtain recycled metalized PET pellets having intrinsic viscosity less than 0.60 dl/g; and
   (vi) increasing the intrinsic viscosity of the pellets obtained in step (v) to a value of up to 1.00 dl/g by solid state polymerization of the recycled metalized PET, wherein the metal concentration of the said recycled metalized PET pellets is from 0.45 wt % to 1.49 wt % and the thus obtained recycled metalized PET pellets are suitable for making high quality strapping or monofilament yarn or sheets.

2. The process as claimed in claim 1, wherein the metal in the metalized film is aluminum.

3. The process as claimed in claim 1, wherein the thus obtained recycled metalized PET pellets in step (vi) are suitable for making high quality strapping or monofilament yarn or sheets that are made up of up to 100% of said pellets.

* * * * *